United States Patent
Ilama-Vaquero et al.

(10) Patent No.: US 9,053,103 B2
(45) Date of Patent: Jun. 9, 2015

(54) METHOD AND APPARATUS FOR INTERACTING WITH A PLURALITY OF MEDIA FILES

(75) Inventors: Eeva Ilama-Vaquero, Sunnyvale, CA (US); Tomi Petri Tarvainen, Espoo (FI); Jussi Valtteri Lampainen, Tampere (FI); Terho Niemi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 635 days.

(21) Appl. No.: 12/952,249

(22) Filed: Nov. 23, 2010

(65) Prior Publication Data

US 2012/0131459 A1    May 24, 2012

(51) Int. Cl.
  *G06F 3/048*    (2013.01)
  *G06F 17/30*    (2006.01)
  *G11B 27/10*    (2006.01)
  *G11B 27/34*    (2006.01)

(52) U.S. Cl.
  CPC ........ *G06F 17/30017* (2013.01); *G11B 27/105* (2013.01); *G11B 27/34* (2013.01)

(58) Field of Classification Search
  CPC ...................................................... G06F 21/36
  USPC .......................... 715/716, 810, 835, 836, 848
  See application file for complete search history.

(56) References Cited

U.S. PATENT DOCUMENTS

| | | | |
|---|---|---|---|
| D613,300 S | 4/2010 | Chaudhri | |
| 2004/0155907 A1* | 8/2004 | Yamaguchi et al. | 345/810 |
| 2005/0091596 A1* | 4/2005 | Anthony et al. | 715/712 |
| 2005/0160375 A1* | 7/2005 | Sciammarella et al. | 715/838 |
| 2005/0188326 A1 | 8/2005 | Ikeda | |
| 2007/0160345 A1* | 7/2007 | Sakai et al. | 386/95 |
| 2007/0226645 A1* | 9/2007 | Kongqiao et al. | 715/781 |
| 2008/0062141 A1* | 3/2008 | Chandhri | 345/173 |
| 2008/0065720 A1* | 3/2008 | Brodersen et al. | 709/203 |
| 2008/0065989 A1* | 3/2008 | Conroy et al. | 715/716 |
| 2008/0066016 A1* | 3/2008 | Dowdy et al. | 715/854 |
| 2008/0165152 A1 | 7/2008 | Forstall et al. | |
| 2008/0307309 A1* | 12/2008 | Marinkovich et al. | 715/723 |
| 2009/0125801 A1* | 5/2009 | Algreatly | 715/234 |
| 2009/0228442 A1* | 9/2009 | Adams et al. | 707/3 |
| 2009/0267909 A1 | 10/2009 | Chen et al. | |
| 2009/0304359 A1* | 12/2009 | Lemay et al. | 386/96 |
| 2009/0319949 A1* | 12/2009 | Dowdy et al. | 715/814 |
| 2010/0205563 A1 | 8/2010 | Haapsaari et al. | |
| 2010/0313166 A1* | 12/2010 | Nakayama et al. | 715/810 |

OTHER PUBLICATIONS

International Search Report and Written Opinion for International Application No. PCT/FI2011/050999, mailed Feb. 28, 2012.

* cited by examiner

*Primary Examiner* — Daeho Song
(74) *Attorney, Agent, or Firm* — Alston & Bird LLP

(57) ABSTRACT

Methods, apparatus and computer program products are provided for facilitating interaction with a plurality of media files. In this regard, a method may be provided that includes causing the display of an image of a respective function and a plurality of images of respective media files. The display of the images may be such that at least one image is displayed in the foreground and at least one image is displayed in the background. The method may also receive a selection of the image of the respective function. In response to the selection of the image of the respective function, the respective function is performed with respect to at least one of the media files. For example, the respective function may include a shuffle function such that the plurality of media files are caused to be played in a random order.

20 Claims, 7 Drawing Sheets

METHOD AND APPARATUS FOR INTERACTING WITH A PLURALITY OF MEDIA FILES

TECHNOLOGICAL FIELD

An example embodiment of the present invention relates generally to user interface technology and, more particularly, relates to methods and apparatus for interacting with a plurality of media files.

BACKGROUND

Computing devices, such as mobile telephones, media players, personal computers and the like, are utilized to store an increasing number of media files. For example, these computing devices may store an increasing number of media files including audio files, such as music files and audio books, video files, video games and the like.

Various techniques are employed to provide users with access to the media files. These techniques include, among others, the use of menus to facilitate the identification of a respective media file and the selection of a particular function to be performed relative to a selected media file, such as the playing of an audio file, the launching of a video game or the like. Other techniques that have been developed to access media files represent the media files by icons that are displayed and are selectable by a user in order to access a respective media file.

Regardless of the technique employed to access a media file, it is generally desirable for the technique to be relatively intuitive and to require a limited number of actions by the user, such as clicks or other user inputs, in order to affect the desired function with respect to a respective media file. As at least some of the computing devices have a relatively small form factor, it is also desirable in some instances that the technique utilized to access media files may be presented in a clear and user friendly manner, even in an instance in which the display is relatively compact.

BRIEF SUMMARY

Methods, apparatus and computer program products are provided according to example embodiments of the present invention for facilitating interaction with a plurality of media files. In this regard, methods, apparatus and computer program products of example embodiments may provide an intuitive technique for permitting a user to select a function to be performed with respect to one or more media files. The method, apparatus and computer program product of one example embodiment may allow a user to select a respective function to be performed with respect to one or more media files in a manner that requires a limited number of selections to be made by the user.

In one example embodiment, a method is provided that includes causing the display of an image of a respective function and a plurality of images of respective media files. In this regard, the display of the images may be such that at least one image is displayed in the foreground and at least one image is displayed in the background. The method of this example embodiment also receives a selection of the image of the respective function. In response to the selection of the image of the respective function, the respective function is performed with respect to at least one of the media files. For example, the respective function may include a shuffle function such that the plurality of media files are caused to be played in a random order.

The method of one example embodiment also includes receiving a selection of the image of the respective function in an instance in which the image of the respective function is displayed in the background. In this embodiment, the receipt of the selection of the image of the respective function while the image of the respective function is displayed in the background does not cause performance of the respective function in the same fashion that selection of the image of the respective function while displayed in the foreground may cause the performance of the function. The method may also receive input causing the display of the images to be altered such that at least one image that was in the foreground is moved to the background and such that at least one image that was in the background is moved to the foreground. In this regard, the method of one example embodiment may cause the display of the image of the respective function and the plurality of images of the respective media files to be presented in an ordered sequence such that the input causing the display of the images to be altered causes the images to be moved forward or rearward in accordance with the ordered sequence. In one embodiment, the method further includes causing the display of a plurality of media items within a respective media file in an instance in which the respective media file is displayed in the foreground. In this embodiment, the method may receive a selection of a respective media item from among the plurality of media items that are displayed and may cause the media item that was selected to be played.

In another example embodiment, an apparatus is provided that includes at least one processor and at least one memory storing computer program code with the at least one memory and the computer program code being configured, with the at least one processor, to cause the apparatus at least to cause the display of an image of a respective function and a plurality of images of respective media files. In this regard, the display of the images may be such that at least one image is displayed in the foreground and at least one image is displayed in the background. The at least one memory and the computer program code are also configured, with the at least one processor, to cause the apparatus to receive a selection of the image of the respective function and, in response to the selection of the image of the respective function, to perform the respective function with respect to at least one of the media files. For example, the respective function may include a shuffle function such that the plurality of media files are caused to be played in a random order.

The apparatus of one example embodiment may also be caused to receive a selection of the image of the respective function in an instance in which the image of the respective function is displayed in the background. In this embodiment, the receipt of the selection of the image of the respective function while the image of the respective function is displayed in the background does not cause performance of the respective function in the same fashion that selection of the image of the respective function while displayed in the foreground may cause the performance of the function. The apparatus may also be caused to receive input causing the display of the images to be altered such that at least one image that was in the foreground is moved to the background and such that at least one image that was in the background is moved to the foreground. In this regard, the apparatus of one example embodiment may be caused to cause the display of the image of the respective function and the plurality of images of the respective media files to be presented in an ordered sequence such that the input causing the display of the images to be altered causes the images to be moved forward or rearward in accordance with the ordered sequence. In one embodiment, the apparatus may be further caused to cause the display of a plurality of media items within a respective media file in an instance in which the respective media file is displayed in the foreground. In this embodiment, the apparatus may be caused to receive a selection of a respective media item from among the plurality of media items that are displayed and to cause the media item that was selected to be played.

In a further example embodiment, a computer program product is provided that includes at least one non-transitory computer-readable storage medium having computer-readable program instructions stored therein. The computer-readable program instructions of this embodiment include program instructions configured to cause the display of an image of a respective function and a plurality of images of respective media files. In this regard, the display of the images may be such that at least one image is displayed in the foreground and at least one image is displayed in the background. The computer-readable program instructions of this example embodiment also include program instructions configured to receive a selection of the image of the respective function and program instructions configured, in response to the selection of the image of the respective function, to perform the respective function with respect to at least one of the media files. For example, the respective function may include a shuffle function such that the plurality of media files are caused to be played in a random order.

The computer-readable program instructions of one example embodiment also include program instructions configured to receive a selection of the image of the respective function in an instance in which the image of the respective function is displayed in the background. In this embodiment, the receipt of the selection of the image of the respective function while the image of the respective function is displayed in the background does not cause performance of the respective function in the same fashion that selection of the image of the respective function while displayed in the foreground may cause the performance of the function. The computer-readable program instructions may also include program instructions configured to receive input causing the display of the images to be altered such that at least one image that was in the foreground is moved to the background and such that at least one image that was in the background is moved to the foreground. In this regard, the computer-readable program instructions of one example embodiment may include program instructions configured to cause the display of the image of the respective function and the plurality of images of the respective media files to be presented in an ordered sequence such that the input causing the display of the images to be altered causes the images to be moved forward or rearward in accordance with the ordered sequence. In one embodiment, the computer-readable program instructions further include program instructions configured to cause the display of a plurality of media items within a respective media file in an instance in which the respective media file is displayed in the foreground. In this embodiment, the computer instructions may be configured to receive a selection of a respective media item from among the plurality of media items that are displayed and to cause the media item that was selected to be played.

In yet another example embodiment, an apparatus is provided that includes means for causing the display of an image of a respective function and a plurality of images of respective media files. In this regard, the display of the images may be such that at least one image is displayed in the foreground and at least one image is displayed in the background. The apparatus of this example embodiment also includes means for receiving a selection of the image of the respective function and means for performing, in response to the selection of the image of the respective function, the respective function with respect to at least one of the media files. For example, the respective function may include a shuffle function such that the plurality of media files are caused to be played in a random order.

The above summary is provided merely for purposes of summarizing some example embodiments of the invention so as to provide a basic understanding of some aspects of the invention. Accordingly, it will be appreciated that the above described embodiments are merely examples and should not be construed to narrow the scope or spirit of the invention in any way. It should be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
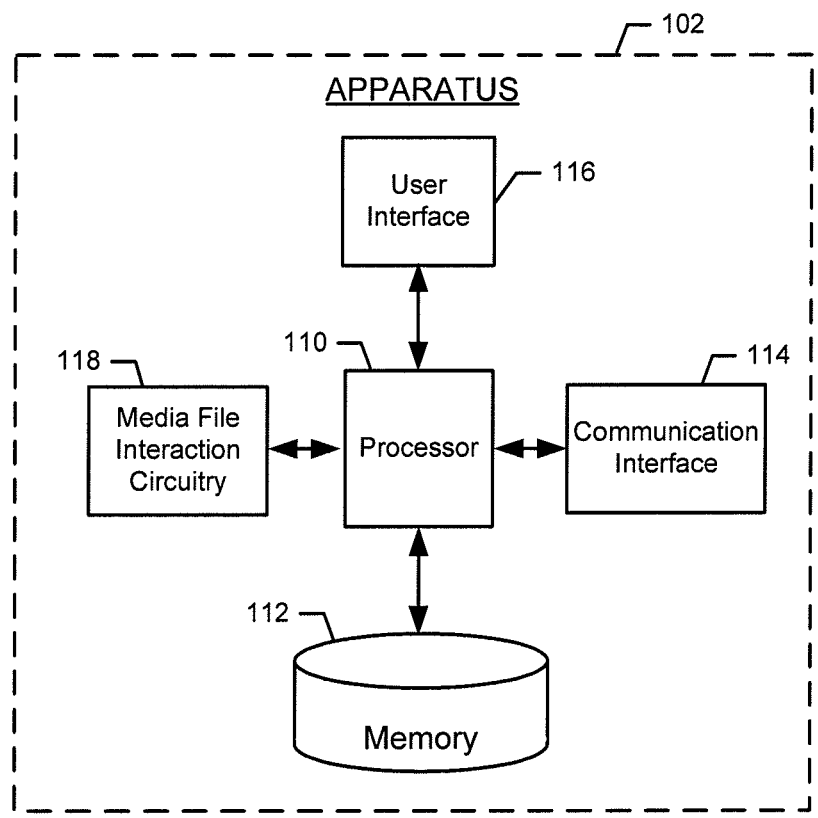
Figure 2:
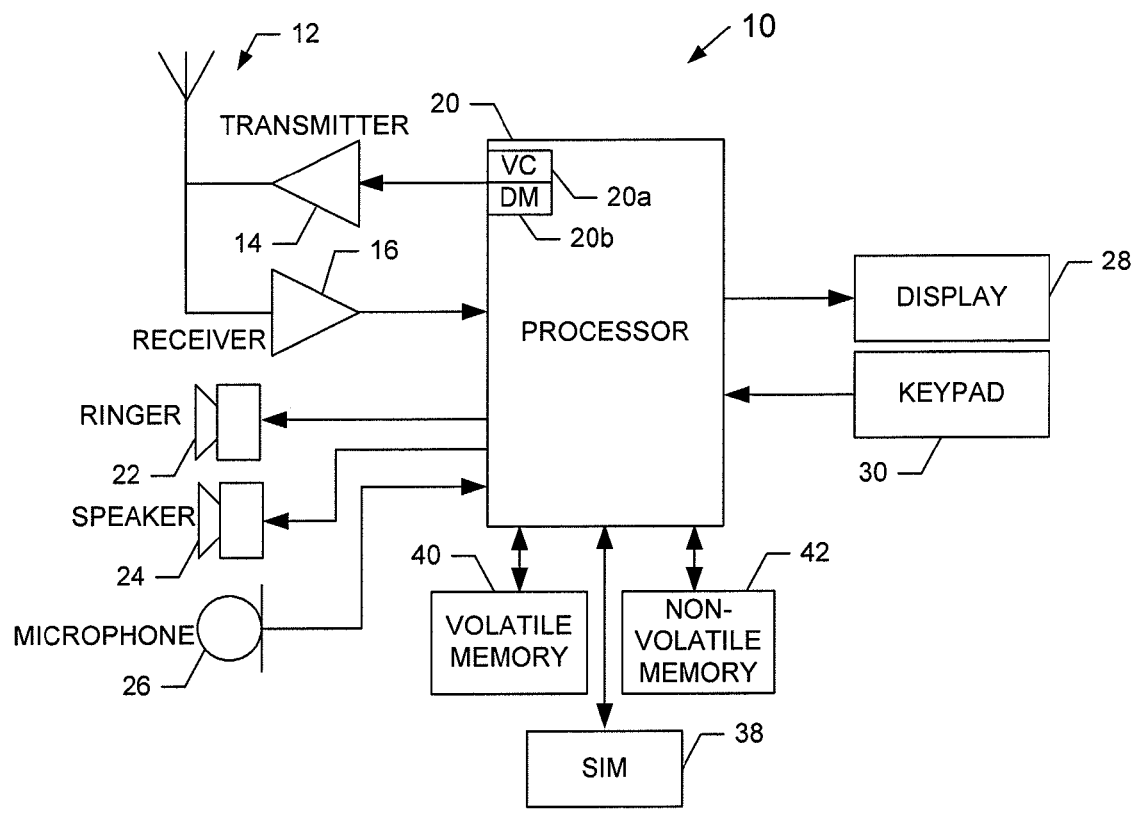
Figure 3A:
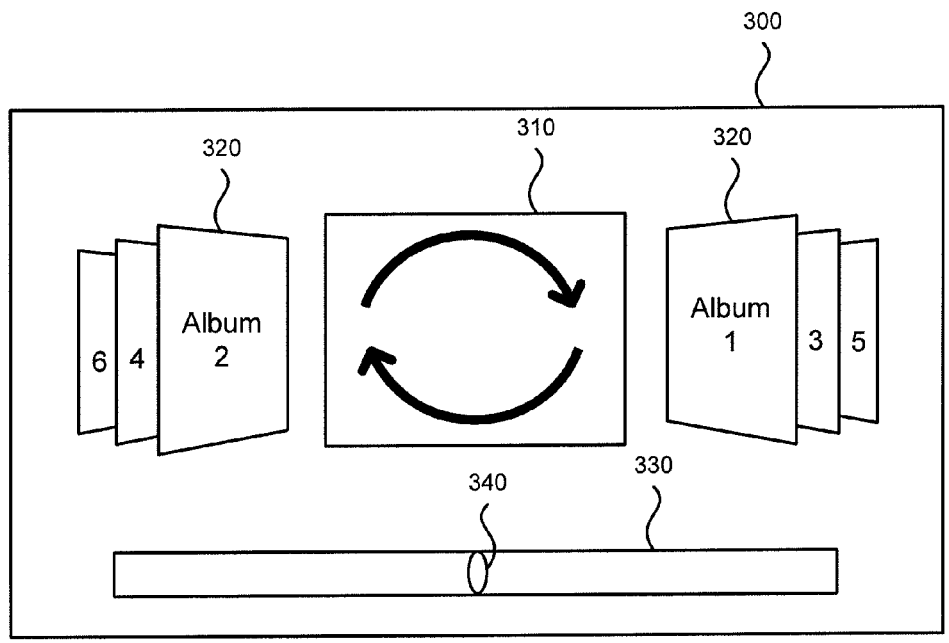
Figure 3B:
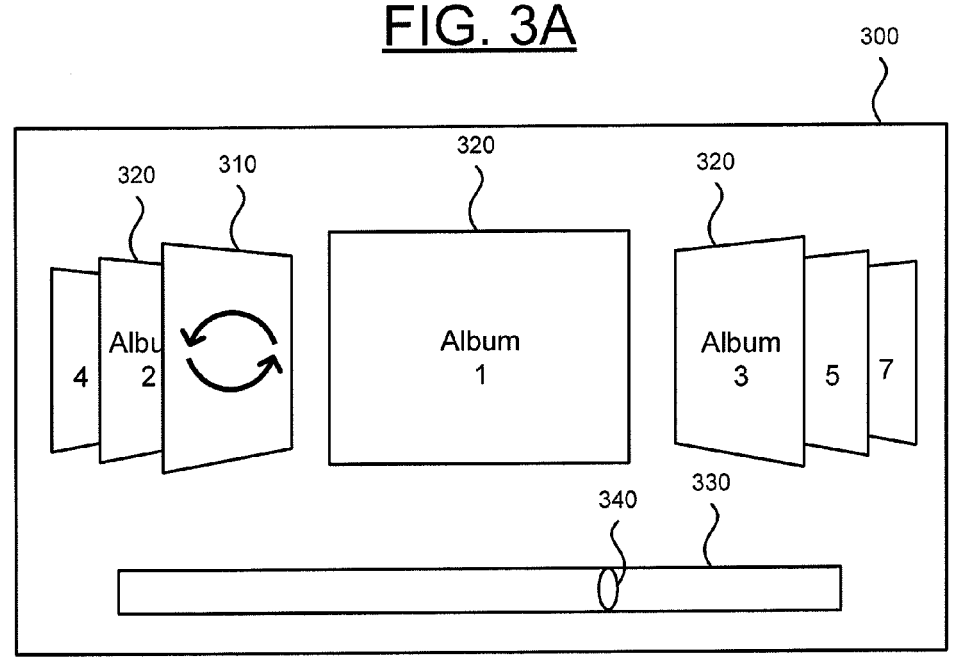
Figure 3C:
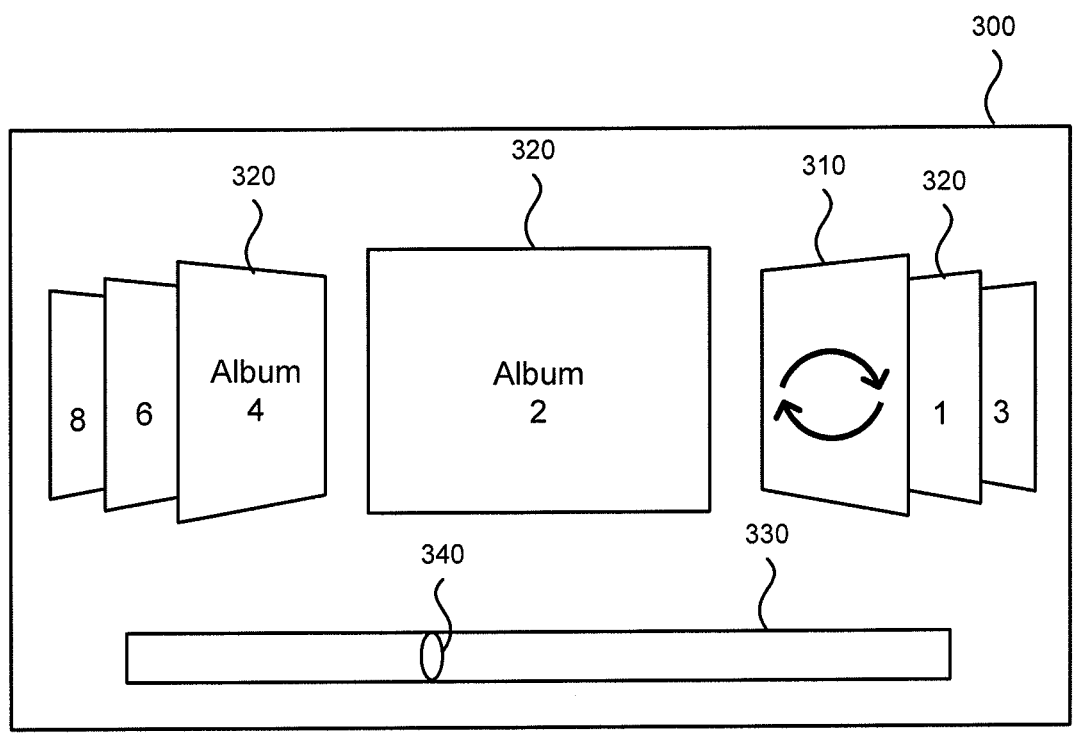
Figure 4:
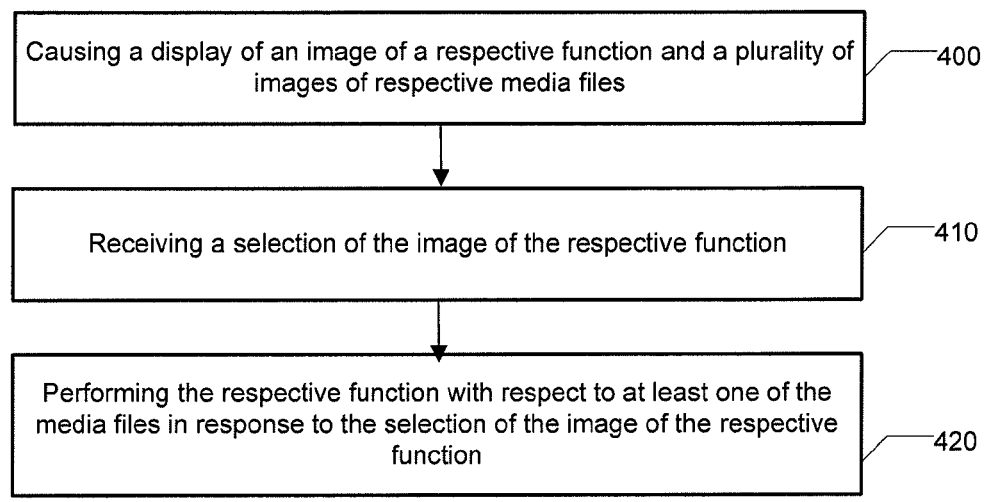
Figure 5:
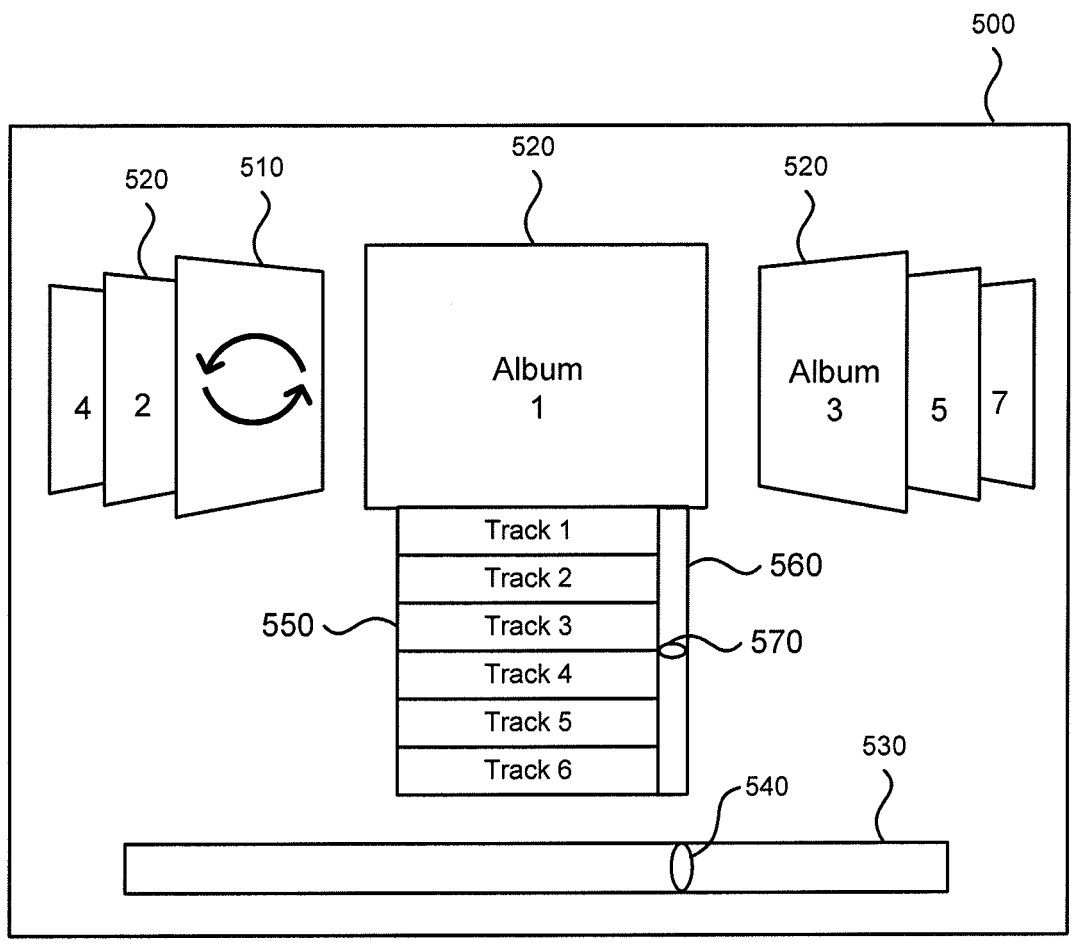
Figure 6:
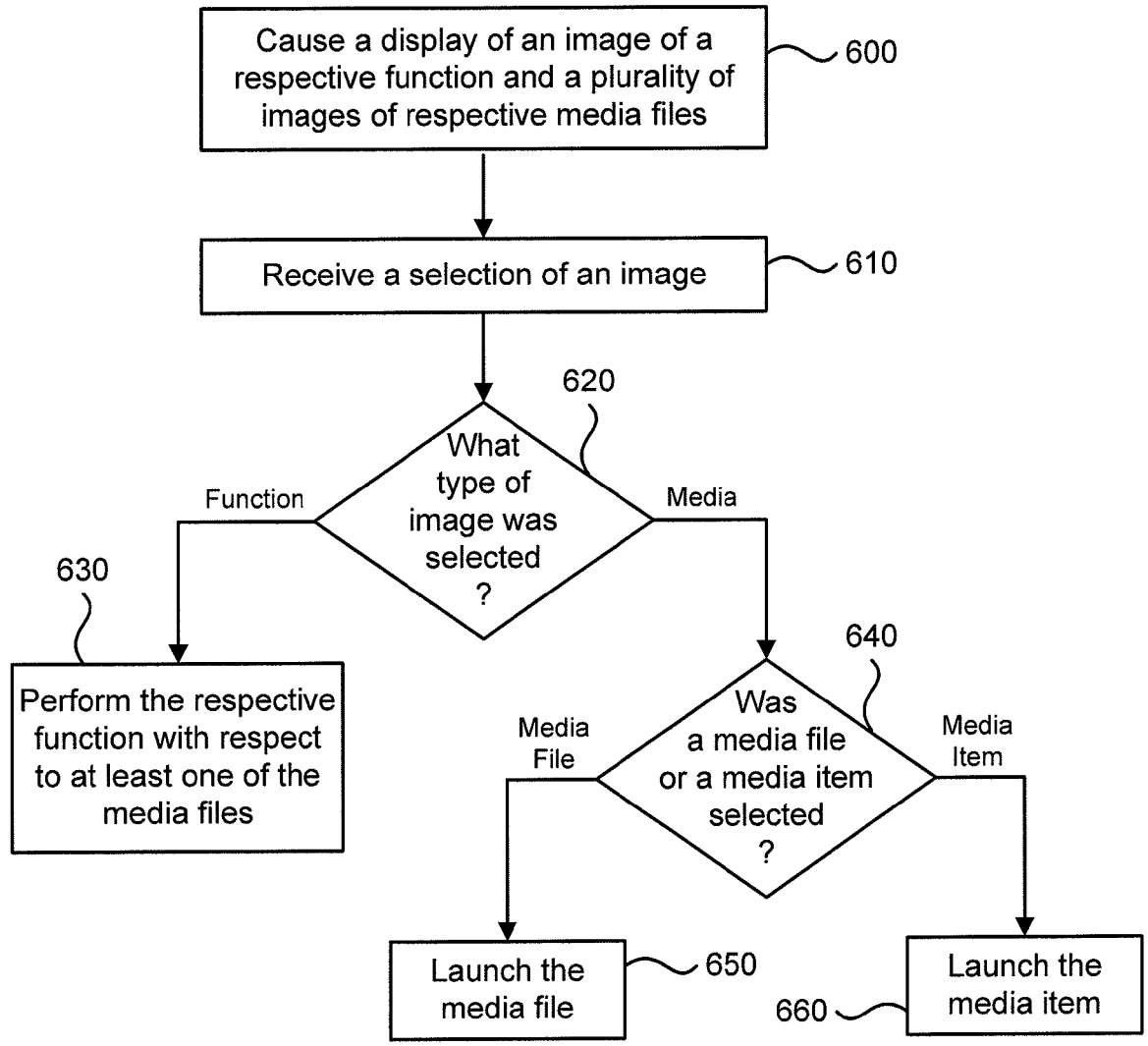

Having thus described the example embodiments in general terms, reference will now be made to the accompanying drawings, which are not necessarily drawn to scale, and wherein:

FIG. 1 illustrates a block diagram of an apparatus for interacting with a plurality of media files in accordance with an example embodiment;

FIG. 2 is a schematic block diagram of a mobile terminal according to an example embodiment;

FIGS. 3A-C illustrate the display of an image of a respective function and the display of a plurality of images of respective media files according to an example embodiment;

FIG. 4 is a flowchart depicting the operations performed in accordance with an example embodiment;

FIG. 5 illustrates the display of an image of a respective media file and its constituent media items according to another example embodiment; and FIG. 6 is a flowchart depicting the operations performed in accordance with another example embodiment.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b), combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for interacting with a plurality of media files according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for interacting with a plurality of media files, other configurations may also be used to implement embodiments of the present invention.

The apparatus 102 may be embodied as a desktop computer, laptop computer, mobile terminal, mobile computer, mobile phone, mobile communication device, one or more servers, one or more network nodes, game device, digital camera/camcorder, audio/video or other media player, television device, radio receiver, digital video recorder, positioning device, chipset, a computing device comprising a chipset, any combination thereof, and/or the like. In this regard, the apparatus 102 may comprise any computing device or other apparatus that is configured to display and/or control display of media files. In an example embodiment, the apparatus 102 is embodied as a mobile computing device, such as a mobile terminal, such as that illustrated in FIG. 2.

In this regard, FIG. 2 illustrates a block diagram of a mobile terminal 10 representative of one embodiment of an apparatus 102. It should be understood, however, that the mobile terminal 10 illustrated and hereinafter described is merely illustrative of one type of apparatus 102 that may implement and/or benefit from various embodiments of the invention and, therefore, should not be taken to limit the scope of the disclosure. While several embodiments of the apparatus are illustrated and will be hereinafter described for purposes of example, other types of electronic devices, such as mobile telephones, mobile computers, personal digital assistants (PDAs), pagers, laptop computers, desktop computers, media players, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., user interface software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a touch screen display, a projector, a holographic display or the like. The user input interface may comprise devices allowing the mobile terminal to receive data, such as a keypad 30, a joystick (not shown), and/or other input device. In embodiments including a keypad, the keypad may comprise numeric (0-9) and related keys (#, *), and/or other keys for operating the mobile terminal.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other non-transitory removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may store user interface software configured with the user interface circuitry, to facilitate user control of at least some functions of the mobile terminal 10 through use of a display 28 and to cause at least a portion of a user interface of the mobile terminal to be displayed on the display to facilitate user control of at least some functions of the mobile terminal. As another example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or media file interaction circuitry 118. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, and/or media file interaction circuitry 118 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42. The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110 and/or the media file interaction circuitry 118 during the course of performing their respective functionalities. The memory 112 may also store information in the form of static and/or dynamic information. The stored information may include, for example, media files, such as audio files, such as music files and audio books, video files, video games and the like.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content and/or the like) over a network from a server or other content source (e.g., the content source 304). The communication interface 114 may additionally be in communication with the memory 112, user interface 116, and/or media file interaction circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises or is in communication with a display, the display may comprise, for example, a cathode ray tube (CRT) display, a plasma display panel (PDP), a liquid crystal display (LCD), a light-emitting diode (LED), an organic light-emitting diode display (OLED), a touch screen display, a projector (e.g., a projector configured to project a display on a projection screen, wall, and/or other object), a holographic display, or the like. In embodiments wherein the user interface 116 comprises a touch screen display, the user interface 116 may additionally be configured to detect and/or receive an indication of a touch gesture or other input to the touch screen display. The user interface 116 may be in communication with the memory 112, communication interface 114, and/or media file interaction circuitry 118, such as via a bus.

The media file interaction circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In an embodiment in which the processor 110 is embodied as, includes or other controls the media file interaction circuitry 118, the processor may be said to cause, direct or control the execution or occurrence of the various functions attributed to the media file interaction circuitry as described herein. In embodiments wherein the media file interaction circuitry 118 is embodied separately from the processor 110, the media file interaction circuitry 118 may be in communication with the processor 110. The media file interaction circuitry 118 may further be in communication with one or more of the memory 112, communication interface 114, or user interface 116, such as via a bus.

As shown in FIG. 3A and in operation 400 of FIG. 4, the apparatus 102 includes means, such as the processor 110, the user interface 116, the media file interaction circuitry 118 or the like, for causing a display 300 of an image 310 of a respective function and a plurality of images 320 of respective media files. At least one of the images is displayed in the foreground and at least one of the images is displayed in the background. In the illustrated embodiment, the central image appears to be forward of the other images that are displayed to be flanking the central image to its left and right. As such, the central image of the illustrated embodiment is considered to be in the foreground and the other images that flank the central image and appear to be rearward of the central image to its left and right are displayed in the background. The image that is displayed in the foreground need not be the central image in other embodiments, however, and may be positioned at other locations with respect to the other images. However, the image that is displayed in the foreground generally appears to be forward of the other images that are displayed in the background.

In the embodiment illustrated in FIG. 3A, the image 310 of the respective function is displayed in the foreground and the images 320 of respective media files are displayed in the background so as to flank the image of the respective function to both its left and the right. The images 320 of the respective media files may vary depending upon the type of media files and the information that is to be conveyed by the respective images. In one embodiment in which the media files are music files, the images 320 of the respective music files may be the cover art work for the respective album or compact disc (CD) as indicated generically in FIG. 3A by the designations Albums 1, 3 and 5 and Albums 2, 4 and 6. Alternatively, the images of the music files could simply provide the name of the artist and the title of the album. In other embodiments, the media files are audio files, such as audio books, video files, video games or the like. In instances in which the media files are audio books, the images associated therewith may be the cover artwork for the book or simply the name of the author and the title of the book. In an instance in which the media files are video files, the images may be a representative image from the video file, such as the image that would appear as the cover artwork for the corresponding digital versatile disc (DVD). Finally, in an embodiment in which the media files are video games, the images may be the cover artwork for the DVD of the video game or may simply be the name of the video game. Regardless of the images, the images 320 represent the media files and permit a user to readily identify the media file in an intuitive manner.

As shown in FIG. 3A, the image 310 of the respective function provides an indication to the user of the function that is to be performed in response to the selection of the respective image. For example, the image 310 of the respective function may identify the function either alphanumerically by an icon that represents the function, as shown by the icon representing the shuffle function in FIG. 3A. The function for which an image 310 is displayed may vary depending upon the type of media files for which images 320 are displayed concurrently with the image of the respective function. In an embodiment in which the media files are music files, for example, the function may perform a respective function that is associated with music files. For example, the function may be a shuffle function such that performance of the function comprises a plurality of the media files to be played in a random order, such as by causing a plurality of media items, e.g., music tracks, from the plurality of media files, e.g., music files, to be played in a random order. Alternatively, the function may cause the media file having an image 320 immediately to the right or to the left of the image 320 of the respective function to be played in its entirety. Still further functions may be provided in conjunction with music files as well as other types of media files.

As illustrated by operation 410 of FIG. 4, the apparatus 102 may include means, such as the user interface 116, the processor 110, the media file interaction circuitry 118 or the like, for receiving a selection of the image 310 of the function, such as in response to a user placing a cursor upon the image of the function and double clicking, by selecting the "ENTER" key or by taking some other predefined action. In one embodiment, the selection of the image 310 of the function is received while the image of the function is displayed in the foreground. As illustrated in operation 420 of FIG. 4, the apparatus 102 also includes means, such as the processor 110, the media file interaction circuitry 118 or the like, for performing, in response to the selection of the image 310 of the respective function, the respective function with respect to one or more of the media files having images 320 displayed concurrently with the image of the respective function. As noted above, in an embodiment in which the media files are music files and the function is a shuffle function, the apparatus 102, such as the media file interaction circuitry 118, may cause a plurality of the media files to be played in a random order in response to selection of the shuffle function. By permitting the function to be performed by selection of the image 310 of the function, the method and apparatus 102 of example embodiments of the present invention provide an intuitive interface that permits the function to be performed with a relatively minimal degree of user interaction.

The apparatus 102, such as the user interface 116, the processor 110, the media file interaction circuitry 118 or the like, may be configured to distinguish between different types of selections or user inputs and to respond differently to the different types of selections or user inputs. For example, the apparatus 102 may be configured to distinguish between a short tap and a long tap and to respond differently based upon the type of tap. In this example, the apparatus 102 may be configured to perform the function, such as a shuffle function, in response to a short tap of the image of the function. However, the apparatus 102 may also be configured to perform a different function in response to a long tap of the same image, such as by flipping or opening the image to display a listing of the media files that will be played in a random order in response to actuation of the shuffle function, such as in response to a short tap.

As shown in FIGS. 3B and 3C, the display 300 of the images may be altered such that a different image appears in the foreground. In this regard, the plurality of images may be scrolled to the left or to the right as shown in FIGS. 3B and 3C, respectively, such that the image that was previously in the foreground has moved to the background and an image that was previously in the background has moved to the foreground. With respect to FIG. 3B, the image 310 of the function that was previously in the foreground as shown in FIG.

3A is moved to the left and to the background, while the image 320 of the media file, e.g., Album 1, that was previously to the right and in the background in FIG. 3A is now moved to the foreground in FIG. 3B. Conversely, with respect to FIG. 3C, the image 310 of the function that was previously in the foreground as shown in FIG. 3A is moved to the right and to the background, while the image 320 of the media file, e.g., Album 2, that was previously to the left and in the background in FIG. 3A is now moved to the foreground in FIG. 3C. The apparatus 102, such as the media file interaction circuitry 118, may receive input from the user that causes the display 300 of the images to be altered. For example, the input may be in the form of the user selection of right or left arrow in one embodiment. Alternatively, as shown in the embodiment of FIGS. 3A-3C, the display 300 may include a scroll bar 330 having a handle 340 that may be pulled by user input to the right or left so as to correspondingly move the display of the images to the right or left, respectively. As also illustrated by FIGS. 3A-3C, the plurality of images may be presented in an ordered sequence such that movement of the images precedes to the right or left in accordance with the ordered sequence. As such, the plurality of images remain in the same order from left to right regardless of the image that appears in the foreground and the images that are in the background.

In one embodiment, the presentation of an image in the foreground not only permits the user to more clearly view the image as the result, for example, of its placement and its relative size, but the selection of an image that is in the foreground may cause a different action than the selection of the same image in the background. For example, the selection of an image 310 of the respective function that is displayed in the foreground may cause the function to be performed. Analogously, the selection of an image 320 of a media file that is displayed in the foreground may launch the media file, such as by beginning to play a music file, video file, video game or the like. However, the selection of an image that appears in the background may not have the same action, but may simply cause the images to be repositioned such that the image that was selected in the background is now presented in the foreground so as to be available for actuation by the user. As such, in this embodiment, the selection of the image 310 of the respective function that appears in the background would not cause the performance of the respective function. In other embodiments, however, the images may be similarly actuated while appearing in either the foreground or the background, with the image in the foreground simply being easier to view than those in the background.

In one embodiment, the apparatus 102, such as the media file interaction circuitry 118, may be configured to at least initially cause the display 300 to present the image 310 of the respective function in the foreground as shown in FIG. 3A upon initiating the display of the media files. In other embodiments, however, the image 310 of the respective function need not be initially displayed in the foreground, but may, instead, be displayed in the background.

As shown in FIG. 5, the apparatus 102, such as the media file interaction circuitry 118, may provide a display 500 that includes additional information in an instance in which an image 520 of a respective media file is displayed in the foreground and an image 510 of the respective function is displayed in the background. In this regard, a media file may include a plurality of media items. In one embodiment in which the media file is a music file, the music file may include a plurality of tracks from the album, CD or the like represented by the image of the music file. As such, the image 520 of the music file that is presented in the foreground may also include a listing 550 of the media items, such as the tracks. In an embodiment in which the media files are music files, a listing of the tracks, such as by title, may be provided. As such, the apparatus 102, such as the media file interaction circuitry 118, may receive not only a selection of the image 520 of the media file in order to launch or open the media file, such as by beginning to play tracks from a music file, but the apparatus, such as the media file interaction circuitry, may receive a selection of a particular media item and may, in response, perform a predefined action with respect to the selected media item including opening the selected media item, such as by beginning to play the particular track that has been selected in an instance in which the media file is a music file. As such, the method and apparatus 102 of this example embodiment permit more granular selections to be provided by a user in an intuitive manner and with a minimal amount of user interaction. Indeed, the apparatus 102, such as the media file interaction circuitry 118, may provide a display 500 that includes both a scroll bar 530 and associated handle 540 for repositioning the images 520 of the media files and the image 510 of the respective function as well as a scroll bar 560 and associated handle 570 for scrolling through the media items of a respective media file. Additionally, the list of media items that is displayed in one embodiment may include not only a listing of media items, but also a element or button representing a shuffle or other function such that selection of this element or button from the list causes performance of the respective function, albeit with respect to the media items included within the particular media file, and not the other media files that are in the background.

As shown in operations 600 and 610 of FIG. 6, the apparatus 102 may include means, such as the processor 110, user interface 116, media file interaction circuitry 118 or the like, for causing a display of an image 510 of a respective function and a plurality of images 520 of respective media files and for receiving a selection of an image. As shown in operation 620, the apparatus 102 of this example embodiment may also include means, such as the processor 110, the media file interaction circuitry 118 or the like, for determining if the image that was selected is the image 510 of a function or an image 520 of a media file or media item. The apparatus 102 may also include means, such as the processor 110, the media file interaction circuitry 118 or the like, for performing the respective function with respect to at least one of the media files in an instance in which the selected image is the image 510 of a respective function. See operation 630. Additionally, the apparatus 102 of this embodiment may also include means, such as the processor 110, the media file interaction circuitry 118 or the like, for determining if a media file or a media item was selected in an instance in which the selected image is not an image 510 of a respective function. See operation 640. In an instance in which a media file was selected, the apparatus 102 may include means, such as the processor, the media file interaction circuitry 118 or the like, for launching the media file, such as by playing the tracks of a music file in sequential order. See operation 650. Alternatively, in an instance in which a media item was selected, the apparatus 102 may include means, such as the processor 110, the media file interaction circuitry 118 or the like, for performing a predefined function including launching the media file, such as by playing the respective media item, e.g., a musical track. See operation 660.

FIGS. 4 and 6 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110 and/or the media file interaction circuitry 118) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A method comprising:
    causing a display of an image of a respective function and a plurality of images of respective media files, wherein causing the display comprises causing the display of the images such that at least one image is displayed in a foreground and at least one image is displayed in a background;
    receiving input causing the display of the images to be altered such that the image of the respective function and the images of the respective media files move in a uniform manner;
    receiving a selection of the image of the respective function; and
    performing, with a processor, the respective function with respect to at least one of the media files in response to the selection of the image of the respective function, and
    wherein the image of the respective function presents a graphical indication associated with the function that is to be performed in response to the selection of the image of the respective function while the image of the respective function is displayed in the foreground and the images of the media files associated with the respective function are displayed in the background.

2. A method according to claim 1 wherein the respective function comprises a shuffle function, and wherein performing the respective function comprises causing a plurality of the media files to be played in a random order.

3. A method according to claim 1 wherein receiving the selection of the image of the respective function comprises receiving the selection of the image of the respective function in an instance in which the image of the respective function is displayed in the foreground, wherein performing the respective function comprises performing the respective function with respect to at least one of the media files in response to the selection of the image of the respective function in the instance in which the image of the respective function is displayed in the foreground, and wherein the method further comprises receiving a selection of the image of the respective function in an instance in which the image of the respective function is displayed in the background, wherein receipt of the selection of the image of the respective function while the image of the respective function is displayed in the background does not cause performance of the respective performance.

4. A method according to claim 1 wherein receiving input causing the display of the images to be altered comprises receiving input causing the display of the images to be altered such that the at least one image that was in the foreground is moved to the background and such that at least one image that was in the background is moved to the foreground.

5. A method according to claim 4 wherein causing the display comprises causing the display of the image of the respective function and the plurality of images of respective media files to be presented in an ordered sequence such that the input causing the display of the images to be altered causes the images to be moved forward or rearward in accordance with the ordered sequence.

6. A method according to claim 1 further comprising causing a display of a plurality of media items within a respective media file in an instance in which the respective media file is displayed in the foreground.

7. A method according to claim 6 further comprising receiving a selection of a respective media item from among the plurality of media items that are displayed and causing a predefined action to be taken with respect to the media item in response to the selection.

8. An apparatus comprising at least one processor and at least one memory storing computer program code, wherein the at least one memory and stored computer program code are configured, with the at least one processor, to cause the apparatus to at least:
cause a display of an image of a respective function and a plurality of images of respective media files by causing the display of the images such that at least one image is displayed in a foreground and at least one image is displayed in a background;
receive input causing the display of the images to be altered such that the image of the respective function and the images of the respective media files move in a uniform manner;
receive a selection of the image of the respective function; and
perform the respective function with respect to at least one of the media files in response to the selection of the image of the respective function, and
wherein the image of the respective function presents a graphical indication associated with the function that is to be performed in response to the selection of the image of the respective function while the image of the respective function is displayed in the foreground and the images of the media files associated with the respective function are displayed in the background.

9. An apparatus according to claim 8 wherein the respective function comprises a shuffle function, and wherein the at least one memory and stored computer program code are configured, with the at least one processor, to cause the apparatus to perform the respective function by causing a plurality of the media files to be played in a random order.

10. An apparatus according to claim 8 wherein the at least one memory and stored computer program code are configured, with the at least one processor, to receive the selection of the image of the respective function in an instance in which the image of the respective function is displayed in the foreground and to performing the respective function with respect to at least one of the media files in response to the selection of the image of the respective function in the instance in which the image of the respective function is displayed in the foreground, and wherein the at least one memory and stored computer program code are further configured, with the at least one processor, to cause the apparatus to receive a selection of the image of the respective function in an instance in which the image of the respective function is displayed in the background, wherein receipt of the selection of the image of the respective function while the image of the respective function is displayed in the background does not cause performance of the respective performance.

11. An apparatus according to claim 8 wherein the at least one memory and stored computer program code are configured, with the at least one processor, to cause the apparatus to receive input causing the display of the images to be altered by receiving input causing the display of the images to be altered such that the at least one image that was in the foreground is moved to the background and such that at least one image that was in the background is moved to the foreground.

12. An apparatus according to claim 11 wherein the at least one memory and stored computer program code are configured, with the at least one processor, to cause the apparatus to cause the display by causing the display of the image of the respective function and the plurality of images of respective media files to be presented in an ordered sequence such that the input causing the display of the images to be altered causes the images to be moved forward or rearward in accordance with the ordered sequence.

13. An apparatus according to claim 8 wherein the at least one memory and stored computer program code are further configured, with the at least one processor, to cause the apparatus to cause a display of a plurality of media items within a respective media file in an instance in which the respective media file is displayed in the foreground.

14. An apparatus according to claim 13 wherein the at least one memory and stored computer program code are further configured, with the at least one processor, to cause the apparatus to receive a selection of a respective media item from among the plurality of media items that are displayed and to cause a predefined action to be taken with respect to the media item in response to the selection.

15. An apparatus according to claim 8 wherein the apparatus comprises or is embodied on a computing device, the computing device comprising user interface circuitry and user interface software stored on one or more the at least one memory, wherein the user interface circuitry and user interface software are configured to:
facilitate user control of at least one function of the computing device through use of a display; and
cause at least a portion of a user interface of the computing device to be displayed on the display to facilitate user control of the at least one function of the computing device.

16. A computer program product comprising at least one non-transitory computer-readable storage medium having computer-readable program instructions stored therein, the computer-readable program instructions comprising:
program instructions configured to cause a display of an image of a respective function and a plurality of images of respective media files, wherein the program instructions configured to cause the display comprises program instructions configured to cause the display of the images such that at least one image is displayed in a foreground and at least one image is displayed in a background;
program instructions configured to receive input causing the display of the images to be altered such that the image of the respective function and the images of the respective media files move in a uniform manner;
program instructions configured to receive a selection of the image of the respective function; and
program instructions configured to perform the respective function with respect to at least one of the media files in response to the selection of the image of the respective function, and
wherein the image of the respective function presents a graphical indication associated with the function that is to be performed in response to the selection of the image of the respective function while the image of the respective function is displayed in the foreground and the images of the media files associated with the respective function are displayed in the background.

17. A computer program product according to claim 16 wherein the respective function comprises a shuffle function, and wherein performing the respective function comprises causing a plurality of the media files to be played in a random order.

18. A computer program product according to claim 16 wherein the program instructions configured to receive the selection of the image of the respective function comprise program instructions configured to receive the selection of the image of the respective function in an instance in which the image of the respective function is displayed in the foreground, wherein the program instructions configured to perform the respective function comprise program instructions configured to perform the respective function with respect to at least one of the media files in response to the selection of the image of the respective function in the instance in which the image of the respective function is displayed in the foreground, wherein the computer-readable program instructions further comprise program instructions configured to receive a selection of the image of the respective function in an instance in which the image of the respective function is displayed in the background, wherein receipt of the selection of the image of the respective function while the image of the respective function is displayed in the background does not cause performance of the respective performance.

19. A computer program product according to claim 16 wherein the program instructions configured to receive input causing the display of the images to be altered comprise program instructions configured to receive input causing the display of the images to be altered such that the at least one image that was in the foreground is moved to the background and such that at least one image that was in the background is moved to the foreground.

20. A computer program product according to claim 19 wherein the program instructions configured to cause the display comprises program instructions configured to cause the display of the image of the respective function and the plurality of images of respective media files to be presented in an ordered sequence such that the input causing the display of the images to be altered causes the images to be moved forward or rearward in accordance with the ordered sequence.

* * * * *